United States Patent
Kishino et al.

(10) Patent No.: US 8,619,349 B2
(45) Date of Patent: Dec. 31, 2013

(54) PROFILE CREATION METHOD, PROFILE CREATION APPARATUS AND IMAGE PROCESSING APPARATUS FOR PERFORMING COLOR CONVERSION USING A PROFILE

(75) Inventors: Mayuko Kishino, Tokyo (JP); Shinichi Miyazaki, Kawasaki (JP); Toshiki Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 13/370,237

(22) Filed: Feb. 9, 2012

(65) Prior Publication Data

US 2012/0218572 A1    Aug. 30, 2012

(30) Foreign Application Priority Data

Feb. 25, 2011    (JP) .................................. 2011-040842

(51) Int. Cl.
*H04N 1/60*    (2006.01)

(52) U.S. Cl.
CPC ........... *H04N 1/6005* (2013.01); *H04N 1/6058* (2013.01); *H04N 1/6066* (2013.01)
USPC .......................................... 358/518; 358/520

(58) Field of Classification Search
USPC .................. 358/518–521, 530; 382/162, 167; 345/289–591, 600
See application file for complete search history.

(56) References Cited

U.S. PATENT DOCUMENTS

| | | | |
|---|---|---|---|
| 6,437,792 B1 * | 8/2002 | Ito et al. ........................ | 345/600 |
| 6,775,028 B1 * | 8/2004 | Reel .............................. | 358/1.9 |
| 7,463,386 B2 * | 12/2008 | Misumi .......................... | 358/1.9 |
| 8,139,274 B2 * | 3/2012 | Kang et al. .................... | 358/520 |
| 8,325,396 B2 * | 12/2012 | Kishimoto .................... | 358/518 |
| 2011/0116137 A1 | 5/2011 | Uratani et al. ................ | 358/3.23 |
| 2012/0195498 A1 * | 8/2012 | Miyazaki et al. ............. | 382/162 |

FOREIGN PATENT DOCUMENTS

JP    2009-219062    9/2009

OTHER PUBLICATIONS

U.S. Appl. No. 13/358,474, filed Jan. 25, 2012 by Miyazaki et al.

* cited by examiner

*Primary Examiner* — Scott A Rogers
(74) *Attorney, Agent, or Firm* — Fitzpatrick, Cella, Harper & Scinto

(57) ABSTRACT

With an apparatus according to the present invention, when an input color gamut is compressed to an output color gamut, based on the difference value between the lightness of paper white and the lightness at the maximum chroma in the output color gamut of a predetermined hue, if the lightness difference is below a predetermined threshold value, a compression convergence point is set at a position at which lightness is lower than or equal to the lightness at the maximum chroma in the output color gamut. This suppresses reduction of the gradation in the direction of input chroma, and makes it possible to compress the input color gamut to the output color gamut such that excellent color reproduction is achieved while the gradations of lightness and chroma in the input color space are maintained.

8 Claims, 11 Drawing Sheets

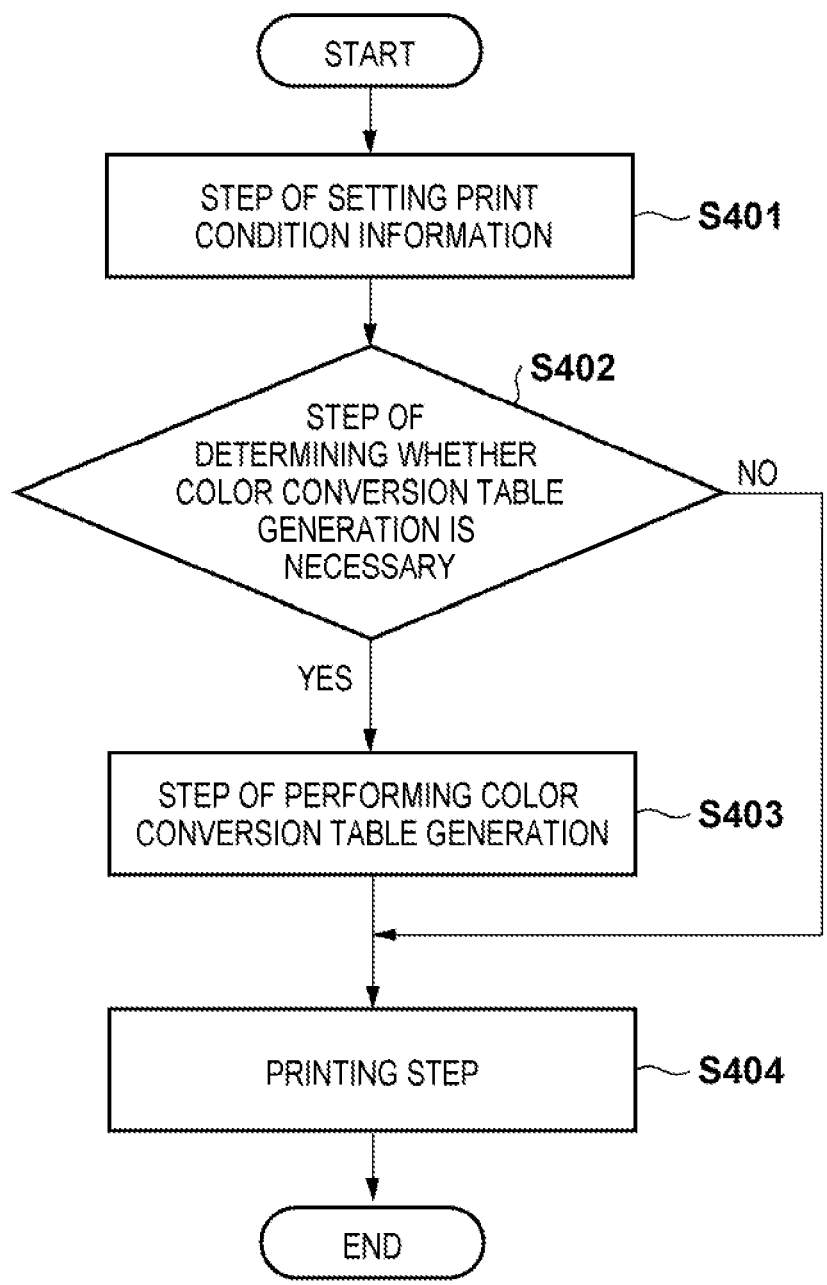

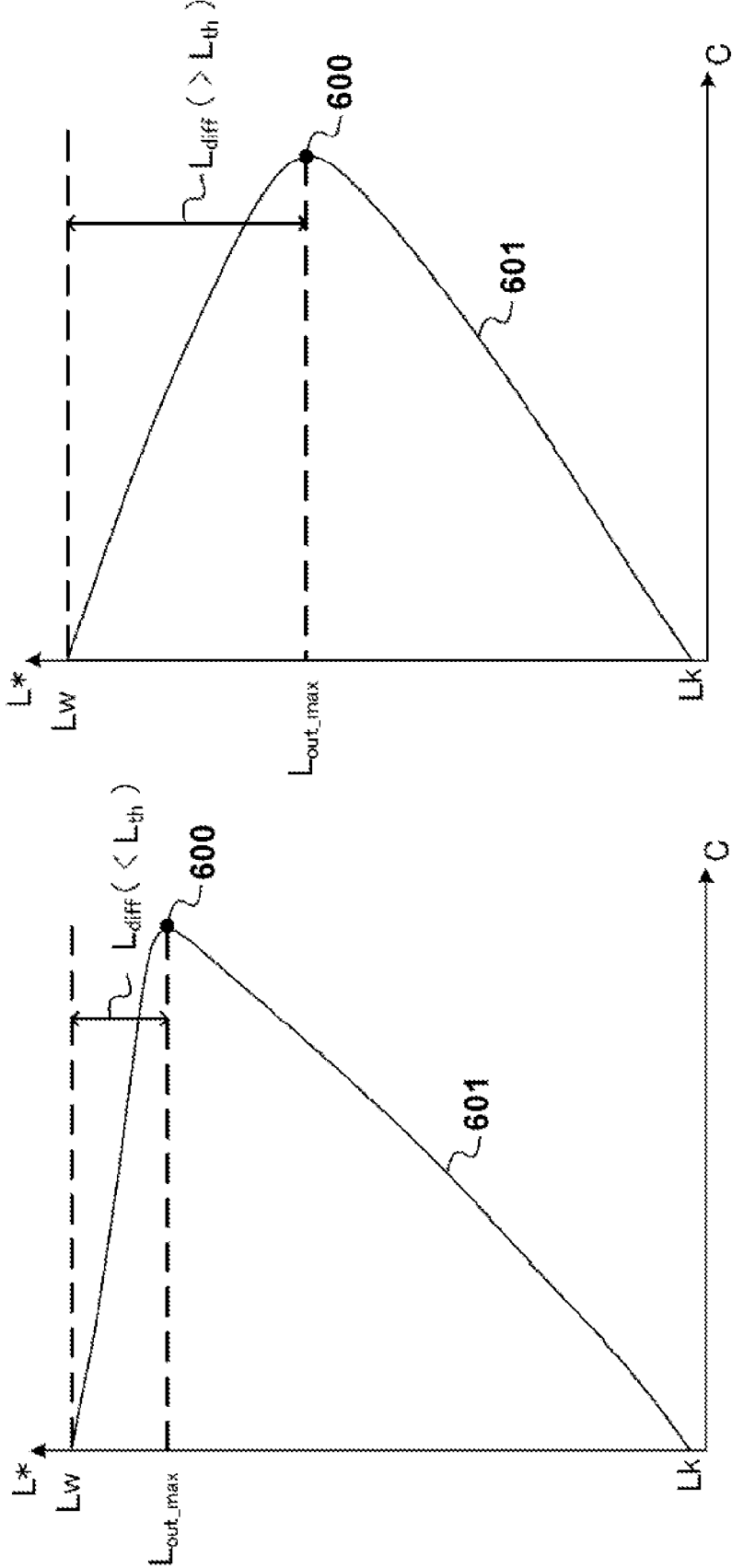

PROFILE CREATION METHOD, PROFILE CREATION APPARATUS AND IMAGE PROCESSING APPARATUS FOR PERFORMING COLOR CONVERSION USING A PROFILE

BACKGROUND OF THE INVENTION

1. Field of the Invention

The present invention relates to a profile creation method and a profile creation apparatus, as well as an image processing apparatus and an image processing system that are for performing color conversion using profiles, and more particularly to color processing for performing gamut mapping that converts the color gamut of an input device to the color gamut of an output device.

2. Description of the Related Art

Wide spread use of digital devices such as digital cameras and image scanners in recent years has made it easy to obtain digital images. This in turn has provided increasing opportunities to display obtained digital images on a monitor, confirm and process the images, and output the images with an inkjet printer or the like. However, various imagers such as monitors and printers generally have different color gamuts (the range of colors that can be represented). For example, there are colors that can be represented by monitors but not by printers, and vice versa. Accordingly, the colors that can be represented by monitors but not by printers need to be replaced by colors that can be represented by printers (color gamut compression). Likewise, when the color gamut of images input by a scanner or digital camera is different from the color gamut output by a monitor or printer, the color gamut of input image data needs to be converted to the color gamut of output image data.

The color gamut compression is carried out using a color profile with which color management is performed. Generally, for example, color profiles proposed by the International Color Consortium (ICC), which are widely used as industry standard, are well-known, but color gamut compression is also carried out with proprietary color profiles of printer companies (color management). Also, the recent emergence of printers with a built-in spectrophotometer (or colorimeter) has increased demand for a technique with which the printer user can independently and automatically generate color profiles for a variety of additional paper types.

The color gamut compression used in the color profile is generally performed within device-independent color space such as CIELab space, and there are methods called lightness maintaining compression, minimum colorimetric color difference compression, chroma maintaining compression, and the like. The lightness maintaining compression is suitable for natural images and the like because input lightness and hue are maintained and thus the dimensionality of images can be maintained. The minimum colorimetric color difference compression is suitable for color proofs because a color gamut that is common to input and output devices is reproduced as-is while an uncommon color gamut is associated with the color gamut surface of the output device, and thus input image data can be reproduced in a colorimetrically faithful manner. The chroma maintaining compression is suitable for output of computer graphics, posters or the like because chroma is maintained at a high level.

With the lightness maintaining compression, however, chroma can be reduced significantly depending on the shape of the input color gamut to be compressed, making output images unnatural for viewers. With the chroma maintaining compression, the gradation in the lightness direction is compromised.

In order to solve problems as described above, for example, Japanese Patent Laid-Open No. 2009-219062 proposes a technique in which the degree of similarity between the input color gamut and the output color gamut is detected, based on which the way color gamut compression is performed is changed. FIGS. 8A to 8C show examples in which the input color gamut and the output color gamut are represented in CIE-L*a*b* color space, and the lightness-hue plane is shown with respect to a specific hue. The hue is defined by the ratio between color difference components a* and b*, and a component orthogonal to the lightness axis L* is chroma. Accordingly, the hue plane shows the relationship between lightness L* and chroma c with respect to the specific hue in the L*a*b* color space. As shown in FIG. 8A, if the difference between lightness L1 at the maximum chroma in the input color gamut and lightness L2 at the maximum chroma in the output color gamut is small, it is determined that the input color gamut and the output color gamut are similar in shape, and only chroma is compressed while lightness is maintained. If, on the other hand, the lightness difference between L1 and L2 is large as shown in FIG. 8B, it is determined that they are not similar in shape, and both lightness and chroma are compressed. In this manner, color gamut conversion according to the shapes of input and output color gamuts is performed.

With the conventional technique described in Japanese Patent Laid-Open No. 2009-219062, if the input and output color gamuts are similar in shape, compression is performed while lightness is maintained. In this case, if there is not so much difference between the highest lightness Lw (paper white) and the lightness L2 at the maximum chroma in the output color gamut, in the lightness region above the maximum chroma, there will be a large chroma difference between input and output at the same lightness. Accordingly, if color gamut conversion is performed using a profile that performs mapping from the input color gamut to the output color gamut generally along the chroma axis in order to maintain lightness, as shown in FIG. 8C, a problem arises in that the gradation in the chroma direction is reduced.

SUMMARY OF THE INVENTION

The present invention has been conceived in view of the conventional technique described above, and the present invention provides a profile creation method and a profile creation apparatus for creating profiles with which excellent color gamut conversion can be performed while the reproducibility of chroma is maintained, even when the input color gamut and the output color gamut are similar in shape and there is a large difference between the chroma in the output color gamut and that of the input color gamut at the same lightness, and an image processing apparatus and an image processing system for performing color conversion using such profiles.

As a method for solving the above-described problems, the present invention has the following features. Specifically, the present invention is a profile creation apparatus for creating a color profile in which color conversion from first color space to second color space that is different from the first color space is defined, the apparatus including: a color gamut information obtaining unit configured to obtain second color gamut information in which the second color space and standard color space are associated with each other; a comparison unit configured to, for each hue of interest, compare a difference in the second color space between color lightness corresponding to maximum chroma in the standard color space and maximum lightness in the second color space, with a predetermined threshold value; and a profile creation unit configured to, in a case where the difference is smaller than or equal to the threshold value, create a color profile by compressing a color, in the first color space, that has higher lightness than lightness corresponding to the maximum chroma into a color gamut of the second color space, using, as a focus point, a point on a lightness axis at which lightness is lower than the lightness corresponding to the maximum chroma.

According to the present invention, it is possible to achieve excellent color reproduction while maintaining the gradation of the input color gamut even after the input color gamut has been compressed to the output color gamut.

In addition, automatic color profile generation is carried out, and thus an appropriate lightness- or chroma-maintaining color profile can be created with ease.

Further features of the present invention will become apparent from the following description of exemplary embodiments with reference to the attached drawings.

BRIEF DESCRIPTION OF THE DRAWINGS

FIG. 4 is a flowchart illustrating overall processing performed by the image processing apparatus shown in FIG. 2.

FIGS. 6A and 6B are diagrams obtained by cutting the output color gamut at a predetermined hue angle θ in L*a*b* space.

DESCRIPTION OF THE EMBODIMENTS

Hereinafter, a printer apparatus and system using color gamut compression according to an embodiment of the present invention will be described. It is to be understood that a printer apparatus is used merely as an example, and the present invention is applicable to other output apparatuses such as a display apparatus as long as the output color gamut can be identified, and the printer apparatus is applicable to various printing systems such as an inkjet system and an electrophotographic system.

Configuration of Printer System

Figure 1:
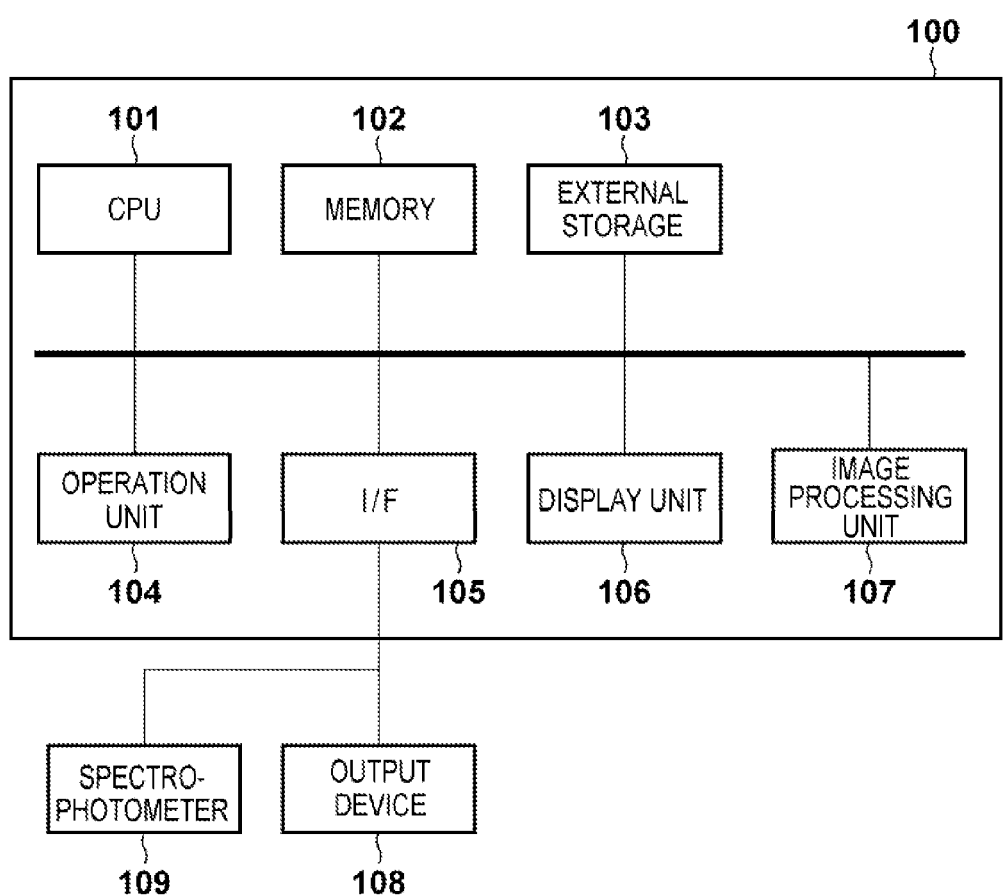
FIG. 1 is a block diagram showing a schematic configuration of an image processing apparatus according to the present invention.

FIG. 1 shows an example of an overall system configuration used to describe an embodiment of the present invention. A host computer 100 includes a CPU 101, a memory 102, an external storage 103, an operation unit 104, an interface 105, a display unit 106, an image processing unit 107, an output device 108 and a spectrophotometer 109. The CPU 101 performs image processing as described later using data and programs stored in the memory 102. A program for implementing a profile creation apparatus according to the present embodiment and necessary data are stored in the external storage 103 such as a hard disk, and loaded into the memory 102 as needed. The image processing unit 107 is where color gamut conversion according to the present embodiment is performed, and creates color profiles for converting the input color gamut to the output color gamut. The content of processing performed by image processing unit 107 will be described later. The image processing unit 107 may be implemented by the CPU 101 executing a program describing the procedure shown in FIGS. 4 and 5, which will be described later. The operation unit 104 as a user interface (hereinafter referred to as a "UI") receives input of user instructions, parameters and the like. The operation unit 104 is composed of an input I/F device or the like including, for example, a keyboard and a mouse. The display unit 106 is a display device for displaying screens indicating processing according to the present embodiment, as well as the progress and results of the processing, and can be, for example, a monitor. The host computer 100 is connected to the output device 108 and the spectrophotometer 109 via the interface 105. The output device 108 outputs images using an inkjet printer, a thermal transfer printer, a dot printer or the like. The spectrophotometer 109 performs colorimetry on each patch of a patch chart in which color patches of predetermined colors are arranged and that has been printed by the output device 108, and stores and manages the results in an output color gamut storage unit 204 provided in the image processing unit 107 shown in FIG. 2. The colors that have undergone colorimetry are represented in device-independent standard color space (for example, CIE-L*a*b* color space in the present embodiment), and stored in association with the output image data of respective patches. This will be referred to as "output color gamut information (second color gamut information)". The information may of course be implemented as information in which the values of the above colors in the standard color space have been associated with grid points in device-dependent color space. In normal printing, the output image data is RGB image data or the like that has been converted to the output color gamut, but a patch chart for creating a profile is used to identify the output color gamut of an output device in standard color space, and thus color gamut conversion is not performed. The output color gamut varies from output device to output device according to print settings and the like such as the type of paper and print quality, and thus the output color gamut information is created according to the print settings and then stored. The host computer 100 performs transmission and reception of various types of information and data related to control of the output device 108 and the spectrophotometer 109. Control thereof is implemented by the memory 102 and the CPU 101 executing software stored in the external storage 103. In the present embodiment, the spectrophotometer 109 is configured as a unit independent of the output device 108, but even if the output device 108 is configured as a spectrophotometer-embedded output device including the spectrophotometer 109, the same effects can be obtained.

The output device 108 converts, for example, input RGB data to output RGB data, converts the output data to color data of colorants (for example, YMCK), and prints an image using an image forming unit.

Configuration of Color Processing Unit in the Case of Printing

Figure 2:
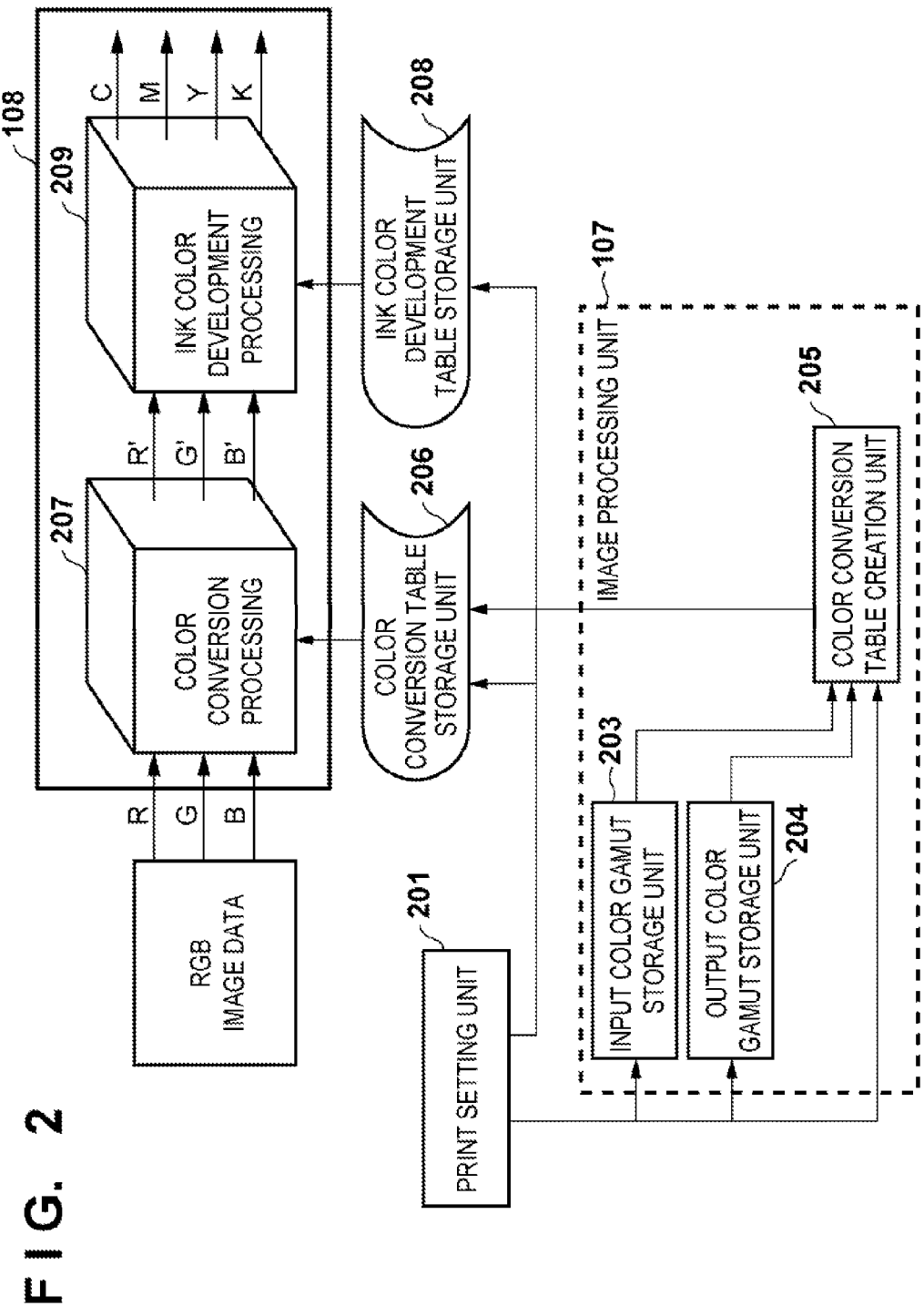
FIG. 2 is a diagram showing an example of a configuration of an image processing apparatus.

FIG. 2 is a diagram showing a configuration of a color processing unit in the case of printing according to the present embodiment, together with the image processing unit 107 for generating a color profile. The color processing unit as used herein refers to a unit that performs color processing such as color conversion in the output device 108. In the present embodiment, the color processing unit will be described as being mounted in the output device, but it may of course be provided in the host computer 100. In such a case, RGB data compressed in the output color gamut of the output device may be output to the output device, or image data converted to ink colors may be output to the output device. In FIG. 2, RGB image data represented by RGB luminance signals is transferred from a printer driver installed on the host computer 100 to the output device 108, subjected to processing such as color conversion in the output device 108, and thereafter printed. In the present example, image data that is to be output is, for example, an image or document created with desired application software on the host computer or image data captured by a scanner or camera, and is output from the application program or the like and printed by the output device 108 via the printer driver in response to user instructions or the like.

A print setting unit 201 is one of the functions of the printer driver, and stores print paper settings, print image objective settings, printing quality settings and the like as print settings in response to user designation. In the print paper settings, for example, the type of print paper such as glossy paper, coated paper or plain paper is selected. In the print image objective settings, portrait image, landscape image, minimum color difference, vibrancy preference and the like are selected and set in a similar manner. In the printing quality settings, image quality preference, speed preference and the like are set. In the case of an inkjet printer, for example, in the printing quality settings, settings for control are made by changing the number of passes for multi-pass printing, the head carriage speed, the image resolution and the like. These print settings serve as parameters for selecting a color conversion table by being combined with a specified preference attribute for color conversion (also referred to as "print objective" in the present embodiment) such as lightness preference or chroma preference. In other words, color conversion tables are created by associating the print settings and the preference attributes with each other and stored, and a color conversion table according to the specified print settings and preference attribute is created and used in color conversion.

The image processing unit 107 performs image processing including profile creation processing according to the present embodiment, or in other words, in this example, color conversion table creation processing in which color conversion is defined. An input color gamut storage unit 203 stores color gamut information of the display of the display unit 106, an input device and the like. The output color gamut storage unit 204 stores color gamut information of the output device 108. The color gamut information stored in each of the color gamut storage units is represented in, for example, a table in which respective values (for example, RGB values) in the input color space (first color space) and the output color space (second color space) that correspond to the color of a given grid point in the L*a*b* color space that is the standard color space, the color being represented by the L*a*b* values of the grid point, are associated with that grid point and stored. Colors other than those of the grid points are obtained by, for example, neighbor four-point linear interpolation. The input color gamut may be, for example, information provided by the vendor of the input or output device, or data obtained from image data output as a result of reading a color chart having known values in the standard color space. With respect to the output color gamut, in the present example, output color gamut information measured according to the print settings such as the type of paper and the print quality is stored. The output color gamut information can be created by the output device outputting a color chart including patches of predetermined colors and detecting the colors in the standard color space with a sensor. A color conversion table creation unit 205 generates a color conversion table to be stored in a color conversion table storage unit 206 based on the information of the input color gamut storage unit 203, the output color gamut storage unit 204 and the print setting unit 201. The color conversion table is a table for use in color gamut conversion from input image data to output image data. A specific implementation of the image processing unit 107 including these constituent elements will be described later.

The color conversion table storage unit 206 stores a plurality of color conversion tables according to parameter values, using preference attributes and print settings, such as combinations of the type of paper, the print objective and the printing quality, as parameters. These conversion tables are tables for use in color conversion of color images recorded on paper according to the combinations of the type of paper, the print objective and the printing quality and the preference attributes. A conversion table is set, from the color conversion table storage unit 206, in a color conversion processing unit 207 provided in the output device 108 according to the parameter values, and used in color conversion.

The color conversion processing unit 207 performs color conversion processing by three-dimensional lookup table processing using the color conversion table selected according to the parameters. In the present embodiment, each entry in the color conversion table is composed of output RGB image data with 8 bits for each of the signals associated with input RGB image data. In this color conversion table, output colors each corresponding to discrete 17 grid points obtained at an interval of every 15 grid points for each input color are registered. In other words, the color conversion table is a 17×17×17 three-dimensional lookup table. The color conversion processing unit 207 coverts, using the color conversion table, input image data (RGB data) to output image data (R'G'B' data). Generally, the output color gamuts of printers are smaller than the input color gamuts of input devices so that the entire range is not covered. For this reason, the color gamut needs to be compressed. The color gamut compression is one of the purposes of color conversion.

An ink color development table storage unit 208 stores a plurality of ink color development tables for use in developing RGB data corresponding to a combination of the type of print paper and the printing quality to CMYK ink colors. An ink color development table corresponding to the type of paper and the printing quality that have been set with the print setting unit 201 is converted to parameters for ink color development processing unit 209, and set in the ink color development processing unit 209 in the output device 108 via the interface 105. The ink color development processing unit 209 is also performed by three-dimensional lookup table processing. Similarly to the color conversion table, the ink color development table is a 17×17×17 three-dimensional lookup table in which output colors each corresponding to discrete 17 grid points obtained at an interval of every 15 grid points for each input color are registered. The processing of RGB image data, or in other words, color conversion processing is carried out by, for example, the output device 108 such as a printer. In the present embodiment, the color conversion table is created by the printer driver. The color conversion processing is performed in the output device (printer), and thus the created color conversion table is transmitted to the output device by the printer driver.

The RGB image data that has been sent to the printer is subjected to color matching by the color conversion processing unit 207, converted to device-specific R'G'B' data, and then converted to CMYK data so as to match ink by the ink color development processing unit 209. After that, although not shown, the data is subjected to half-toning processing and print control processing according to known techniques and then printed.

Here, in order to simplify the description, four colorants of C, M, Y and K are used in the output device, but the colorants are not limited thereto. A variety of ink colors are also available such as, six types of ink including pale cyan ink and pale magenta ink as other ink in addition to the above ink, or ten types of ink including R, G and B ink and gray ink in addition to the six types of ink.

Procedure of Print Processing

FIG. 4 is a step chart of a print process according to the present embodiment, showing a step of setting print conditions for print data to be processed to a printing step. Steps S401 to S403 are performed by the host computer, and step S404 is executed by the output device.

Figure 3:
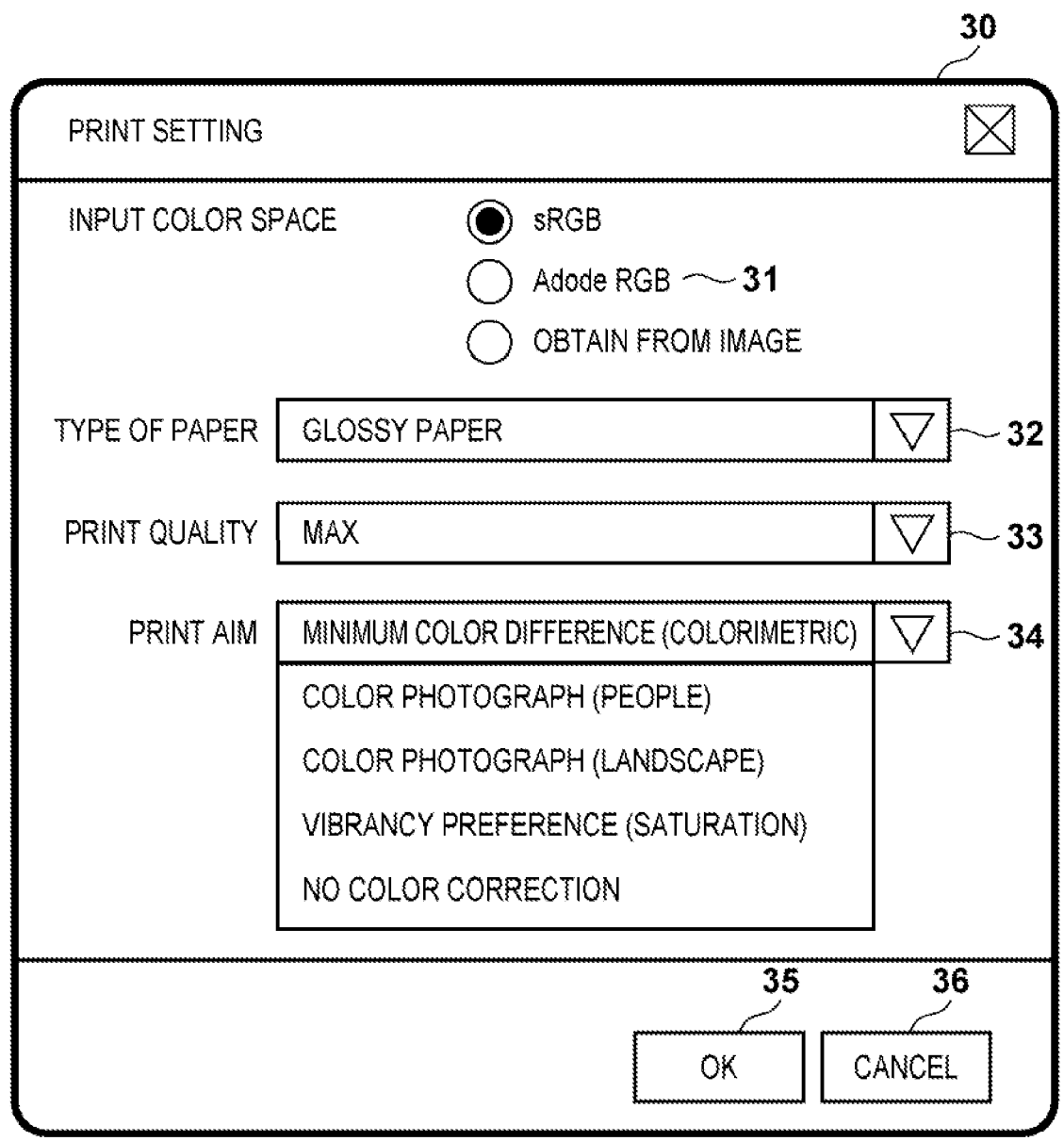
FIG. 3 is a diagram showing an example of a menu screen for print setting.

Step S401 is a step of setting print condition information, where conditions for printing are determined with a print setting screen 30 shown in FIG. 3. FIG. 3 is a diagram showing an example of a menu screen for making print settings. In a field 31, the color space of the input image data is selected. In the case where "Obtain from image" has been selected, the color space of the input image data is identified by checking the header of the image data. In a field 32, the user sets the type of recording medium to be used (for example, glossy paper, plain paper, matte paper or the like). In a field 33, the print quality (for example, highest quality, sharp, fast or the like) is set. In a field 34, the print objective (for example, color photograph (landscape), color photograph (people), vibrancy preference (chroma preference), no color correction, or the like) is set. In the present example, if chroma preference is not set, lightness preference is automatically set, in which an option "minimum color difference" is included.

When the respective conditions described above have been selected and set, entry is completed by the user clicking "OK" in a field 35, and the selected setting values are stored. Then, the procedure advances to the next step. Although not shown, when it is necessary to return to the previous step, the user clicks "Cancel" in a field 36.

Step S402 is a step of determining whether it is necessary to perform color conversion table generation, based on the print condition information. When input/output conditions have been set in the print setting unit 201, it is determined whether a color conversion table having the set input/output conditions as parameters has already been created and stored in the color conversion table storage unit 206. If such a color conversion table has already been created, it is determined that it is unnecessary to perform color conversion table generation. Then, the procedure advances to the print processing in step S404. If, on the other hand, a color conversion table corresponding to the input/output conditions has not yet been created, and the corresponding color conversion table is not stored in the color conversion table storage unit 206, it is determined that it is necessary to perform color conversion table generation, and the procedure advances to step S403.

Step S403 is a step of performing color conversion table generation, where necessary information is input through the display unit 106 and the operation unit 104 and a color conversion table is generated. The generation method will be described later with reference to FIGS. 5A and 5B. A color conversion table and an ink color development table that correspond to the parameters are transmitted to the output device 108 and respectively set in the color conversion processing unit 207 and the ink color development processing unit 209, or in other words, stored in predetermined storage areas.

Step S404 is a printing step executed by the output device 108, where color processing corresponding to the parameters set in the print setting unit 201 is executed. Thereafter, half-toning processing and print control processing are performed and then printing is performed.

Procedure for Creating Color Conversion Table

Figure 5A:
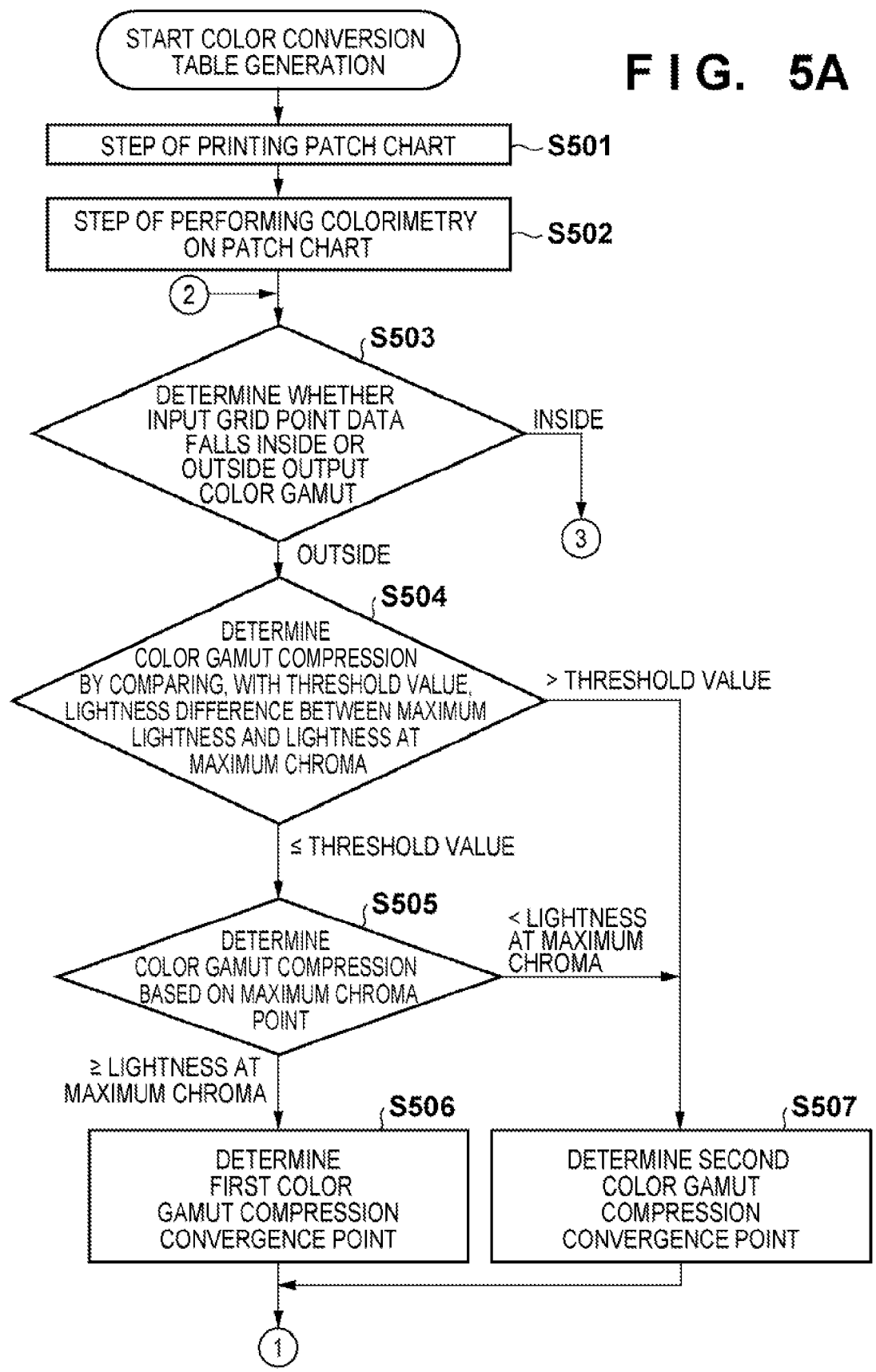
FIGS. 5A and 5B are flowcharts illustrating color conversion table creation processing according to the present invention.
Figure 5B:
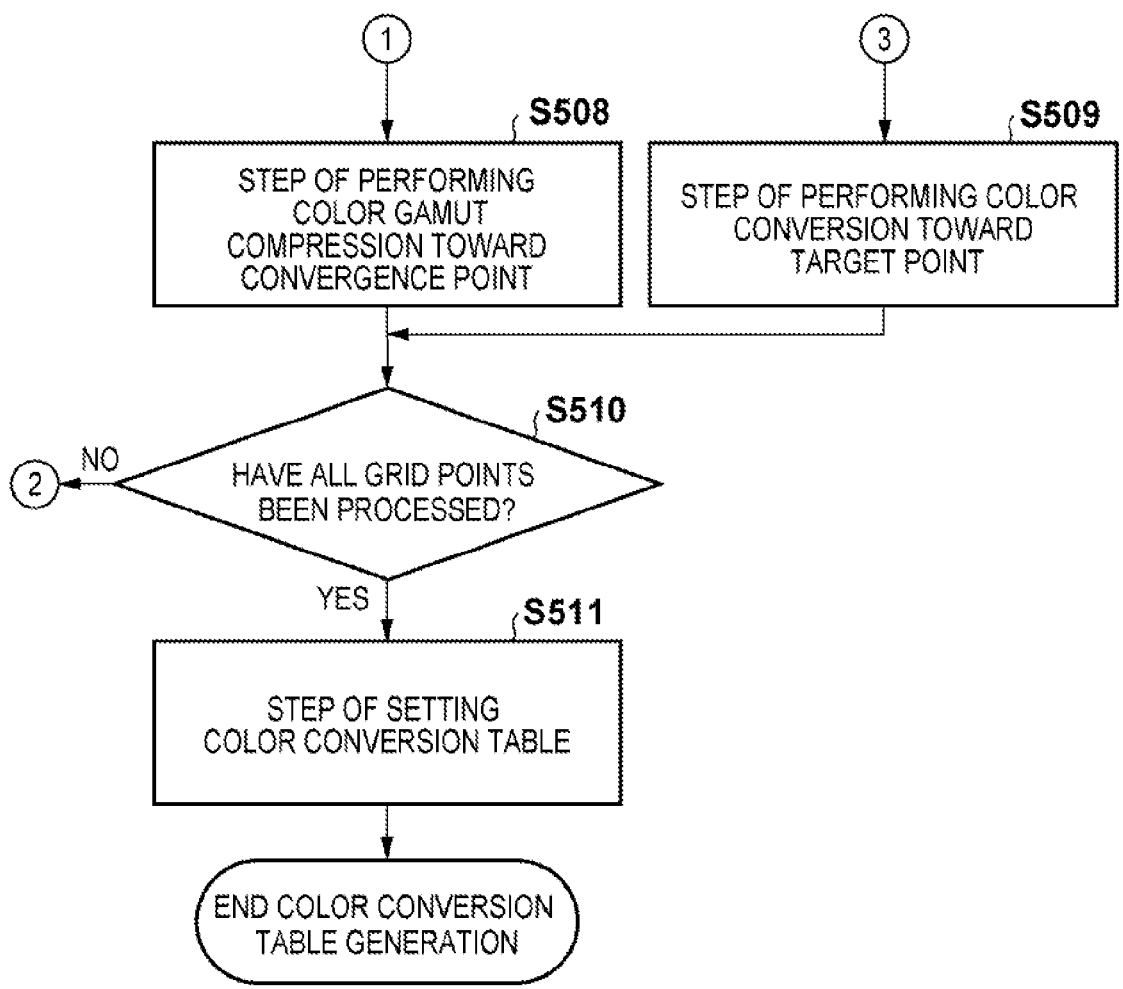

The step of performing color conversion table generation (step S403) will be described below in detail with reference to the flowchart shown in FIGS. 5A and 5B. This procedure involves a step of printing a color chart and subjecting the color chart to colorimetry so as to generate output color gamut information, but if output color gamut information has already been stored in advance, it is unnecessary to perform steps S501 and S502.

Step S501 is a step of printing a patch chart including a plurality of patch portions in order to obtain output color gamut information. The patch chart includes 4913 (17×17×17) patches with 17 gradations at an interval of every 15 grid points for each color corresponding to the RGB values of the grid point in the color conversion processing unit 207 of FIG. 2. The patch chart is stored in advance in the external storage 103 shown in FIG. 1, and printed by a program installed on the host computer 100. The RGB image data shown in FIG. 2 corresponds to the patch chart. In the color conversion processing unit 207, processing is performed such that the values are not changed between input and output. In other words, the color conversion processing unit 207 is not performed for color matching in order to obtain color reproduction information for the device RGB values. In the ink color development processing unit 209, an appropriate table is selected and set from among a plurality of discharge amount restriction ink color development tables created in advance to cope with the addition or creation of new media. After the ink color development processing, although not shown, half-toning processing and print control processing are performed, and thereafter printing is performed.

Step S502 is a step of subjecting a patch portion of the printed patch chart to colorimetry in the spectrophotometer 109 shown in FIG. 1. Colorimetric values obtained by the spectrophotometer 109 are stored and managed in the external storage 103 via the I/F 105 in a manner such that the input RGB values and the colorimetric values (L*a*b*) of the patch portion are associated with each other. Next, with respect to the stored colorimetric values, the following two output color gamut information pieces are stored in the output color gamut storage unit 204 based on the input space set by the print setting unit 201. In the input color gamut storage unit 203, the input space and L*a*b* values corresponding to the RGB values of the grid point have been stored. First output color gamut information is the colorimetric values of the patch portion itself, and information regarding the L*a*b* values obtained as a result of colorimetry on the respective RGB values. Similarly, second output color gamut information stores the output color gamut range as output color gamut information, which can be easily distinguished in subsequent steps, by a known technique based on the colorimetric values. In the present embodiment, the second output color gamut information is stored by storing and managing a*b* values in the gamut boundary (color gamut boundary) region in association with respective L* values ranging from 0 to 100. The color gamut boundary corresponding to given lightness forms a closed line, and therefore in the present example, the second output color gamut information is stored by sampling appropriate hue planes, for example, hue planes obtained every predetermined hue angle about the lightness axis. For example, the color gamut boundary of a given hue is indicated by a series of a*b* values corresponding to the lightness, for example, as shown by a color gamut boundary 601 in FIG. 6A. The first output color gamut information and the second output color gamut information represent, although having different formats, at least the extension of the output color gamut, and thus are collectively referred to as "output color gamut information".

In step S503, L*a*b* values in the standard color space (L*a*b* color space) that correspond to the grid point of interest, or in other words, target RGB values. Specifically, L*a*b* values (L_in, a_in, b_in) of the RGB values of the target grid point are determined from the input color gamut information (first color gamut information) in the input color gamut storage unit 203 shown in FIG. 2. The determined L*a*b* values are compared with gamut boundary region information obtained by interpolation processing from the second output color gamut information in the output color gamut storage unit 204, and it is determined whether they fall inside or outside the output color gamut. If it is determined that they fall outside the color gamut, the procedure advances to step S504. If it is determined that they fall inside the color gamut, the procedure advances to step S509. Whether they fall inside or outside the color gamut is determined by, for example, comparing the L*a*b* of the input image data with the second output color gamut information identified by the color gamut boundary 601 as shown in FIG. 6A.

Step S504 is a step of determining whether to change the color compression method based on the positional relationship between the coordinates of maximum chroma and maximum lightness in the output color reproduction region at a hue angle θ of the target L*a*b*. As the output color gamut information used in this step, in the case where a plurality of print settings such as the type of paper as parameters are prepared, the one corresponding to the set parameters is used. First, a hue angle of the L*a*b* of the input image data determined by the input color gamut storage unit 203 is calculated. The hue angle in the L*a*b* space is determined by the following equation (1):

$$\theta = \arctan(b^*/a^*) \quad \text{Equation (1).}$$

FIGS. 6A and 6B are diagrams showing, with respect to two typical grid points, the state of output color reproduction at each hue angle θ calculated by the above equation (1). Maximum lightness coordinates corresponding to paper white are indicated by (Cw, Lw). Also, the chroma at a maximum chroma point 600 on a boundary line 601 of the output color gamut at the hue angle obtained from the equation (1) is indicated by $C_{out\_max}$, and the corresponding lightness is indicated by $L_{out\_max}$. That is, in FIGS. 6A and 6B, the coordinates of the maximum chroma point 600 are indicated by ($C_{out\_max}$, $L_{out\_max}$). Also, the difference between the maximum lightness Lw of the output color gamut and the lightness $L_{out\_max}$ corresponding to the maximum chroma in the hue plane is calculated, and the obtained result is indicated by $L_{dif}$ (=Lw−$L_{out\_max}$).

FIG. 6A shows an example in which the difference $L_{dif}$ is smaller than or equal to a threshold value $L_{th}$ ($L_{dif} \leq L_{th}$), and FIG. 6B shows an example in which the difference $L_{dif}$ is greater than the threshold value $L_{th}$ ($L_{dif} > L_{th}$). Controlling the compression convergence point according to the difference $L_{dif}$ is a feature of the present embodiment. Here, as an example, the threshold value $L_{th}$ is set to 10.

As described above, in step S504, if the difference $L_{dif}$ is smaller than or equal to the threshold value $L_{th}$ as shown in FIG. 6A, the procedure advances to step S505. If the difference $L_{dif}$ is greater than the threshold value $L_{th}$, the procedure advances to step S507.

Of course, the above determination is merely an example. The threshold value $L_{th}$ can be determined in combination with the maximum chroma in the hue plane, rather than based on the lightness alone. That is, the deviation between the chroma in the input color gamut and that in the output color gamut that correspond to the same lightness can be determined by the ratio between the maximum chroma and the difference between the lightness corresponding to the maximum chroma and the highest lightness (the same applies to the lowest lightness). In the case of the output device, if it is determined that there is not so much change in the maximum chroma due to a change of the hue, the maximum chroma is determined to be constant, and the difference $L_{dif}$ between the lightness corresponding to the maximum chroma and the highest lightness may serve as an indicator value for estimating the degree of degradation of chroma. Accordingly, in the present embodiment, the difference $L_{dif}$ and the threshold value $L_{th}$ are compared so as to control the convergence point (also referred to as the focus point). In consideration of the maximum chroma as well, the convergence point may be controlled by comparing $L_{dif}/C_{out\_max}$ with a threshold value. This configuration will enhance the reproducibility of chroma irrespective of the change of the maximum chroma for each hue.

Step S505 is a step of determining whether to change the color gamut compression method depending on whether the lightness of the target grid point is higher or lower than the lightness at the maximum chroma point of the output color gamut. The processing performed here is carried out after the result shown in FIG. 6A has been received, and will be described with reference to FIG. 7. A region in which the lightness of the coordinates of the maximum chroma point 600 of the output color gamut is higher than or equal to $L_{out\_max}$ and that is outside the output color gamut is defined as a region 700, and a region in which the lightness is lower than or equal to $L_{out\_max}$ and that is outside the output color gamut is defined as a region 701. If the coordinates of the target grid point to be processed belong to the region 700, as shown by a point 702, the procedure advances to step S506. If the coordinates belong to the region 701, as shown by a point 703, the procedure advances to step S507. In other words, if the lightness of the grid point of interest is lower than the lightness corresponding to the maximum chroma in the output color gamut of the hue of the grid point, the procedure advances to S507. If the lightness of the grid point of interest is higher than the lightness corresponding to the maximum chroma in the output color gamut of the hue of the grid point, the procedure advances to S506.

Figure 7:
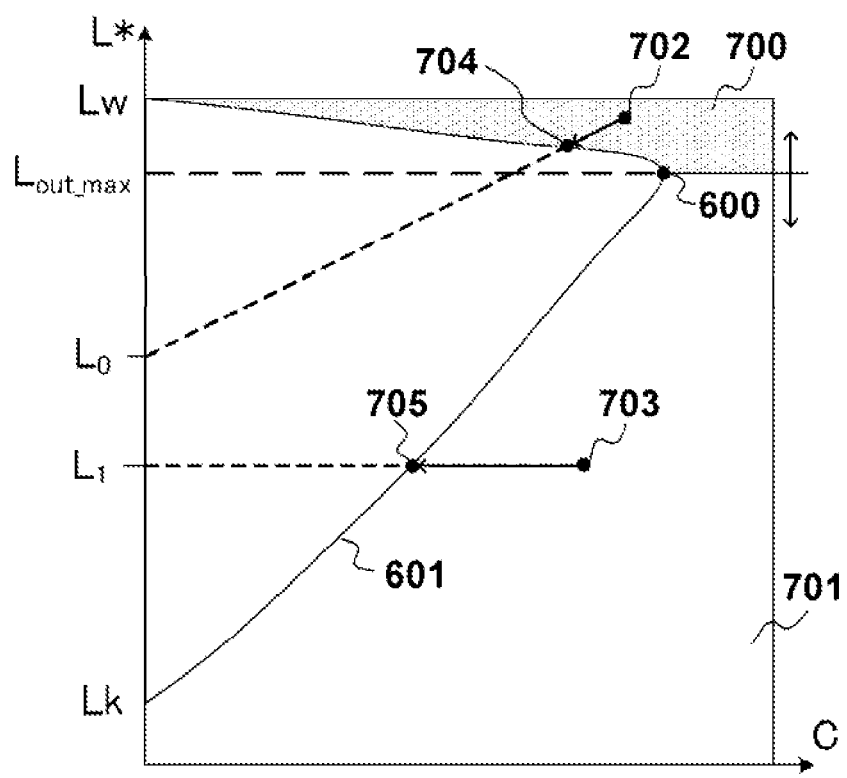
FIG. 7 is a diagram illustrating a color gamut compression method according to the present invention.
Figure 8A:
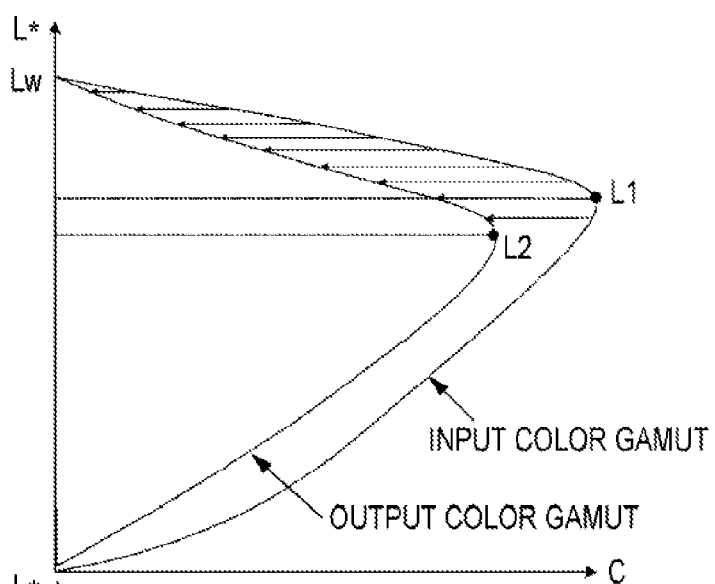
FIGS. 8A, 8B and 8C are diagrams illustrating a conventional color gamut compression method.
Figure 8B:
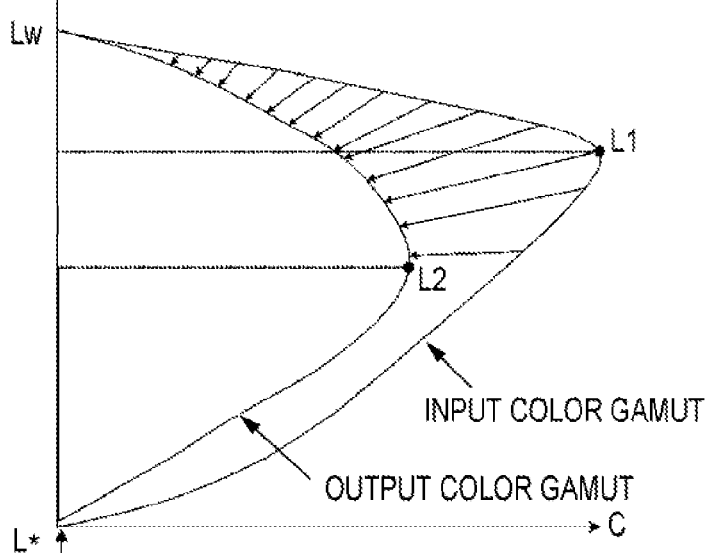
Figure 8C:
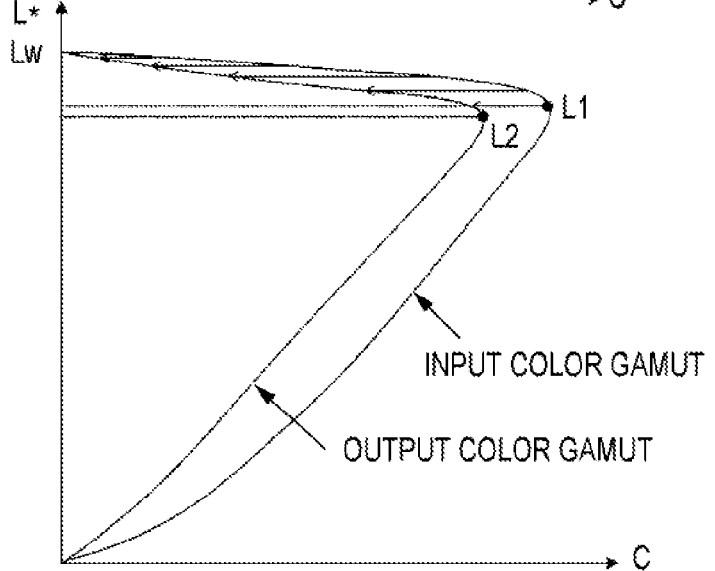

Step S506 is a step of determining a first color compression convergence point, or in other words, determining the convergence point at a position at which the lightness is lower than or equal to $L_{out\_max}$ on the L-axis, which is a feature of the color conversion table creation of the present embodiment. In the case where the convergence point is determined at a position at which the lightness is lower than or equal to $L_{out\_max}$ on the lightness axis, the convergence point may be a fixed point within a predetermined range of the hue angle θ of the target grid point, or may be moved according to the hue angle θ and the lightness L*. However, the convergence point needs to be determined at a position at which the lightness is lower than or equal to $L_{out\_max}$ on the L-axis, which is a feature of the present embodiment. With this configuration, the reproducibility of the gradation of chroma can be improved. In FIG. 7, L0 indicates the convergence point of the target grid point 702.

In step S507, the convergence point is determined according to the print objective. In the case of a print mode that emphasizes dimensionality such as reproducing photographic images, a convergence point using lightness maintaining color gamut compression is determined. In the case where emphasis is placed on colorimetric color difference such as color proofs, a convergence point using minimum colorimetric color difference color gamut compression is determined. In the case where emphasis is placed on vibrant colors such as computer graphics and posters, a convergence point using chroma maintaining color gamut compression is determined. In FIG. 7, L1 indicates, as an example, a convergence point when lightness maintaining color gamut compression has been performed. As the convergence point using lightness maintaining compression, for example, the lightness of the grid point of interest may be used as-is.

Step S508 shows a step of compressing the color gamut toward the convergence point determined in step S506 or S507 described above. As shown in FIG. 7, the grid point 702 in step S506 is subjected to color gamut compression in a direction toward the convergence point L0, and an intersection point 704 with the boundary line 601 of the output color gamut reproduction will serve as the compressed value. Likewise, the grid point 703 in step S507 is subjected to color compression in a direction toward the convergence point L1, and an intersection point 705 with the boundary line 601 of the output color gamut reproduction will serve as the compressed value. Such a compressed color value in the output color space is stored in association with the values of the grid point of interest in the input color space.

Step S509 is a step of performing color conversion when the target grid point falls inside the output color gamut. In this step, mapping is performed on respective target values according to the print objective. In the case of the minimum colorimetric color difference compression such as proofs, processing is performed such that the input L*a*b* values will be output L*a*b* values. Specifically, values in the output color space having the same L*a*b* values as the L*a*b* values of the grid point of interest in the input color space are stored in the form of a table in association with the values of the grid point of interest in the input color space. In the case of the lightness maintaining and chroma maintaining color compression mapping, color conversion is performed such that respective colors become target colors in the output color gamut.

In step S510, it is determined whether all grid points have been processed as a result of performing the processing starting from step S503 described above. Color conversion table parameters are generated by color gamut compression on all grid points. As described above, as the color conversion parameters obtained thus far, L*a*b* values in the output color gamut with respect to the RGB values of each grid point in the three-dimensional lookup table of the color conversion processing unit 207 shown in FIG. 2 have been obtained.

Figure 9A:
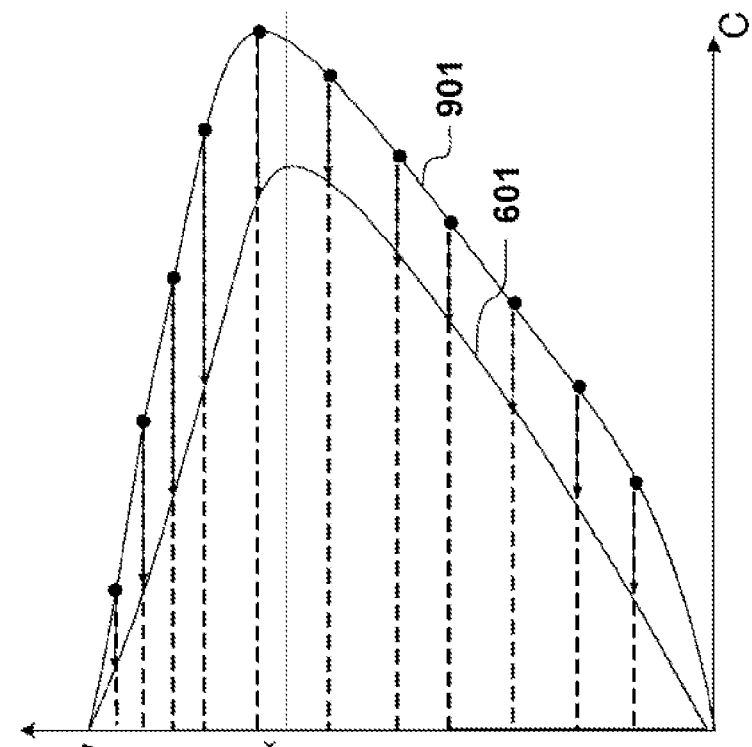
FIGS. 9A and 9B are conceptual diagrams showing results of color gamut compression according to the present invention.
Figure 9B:
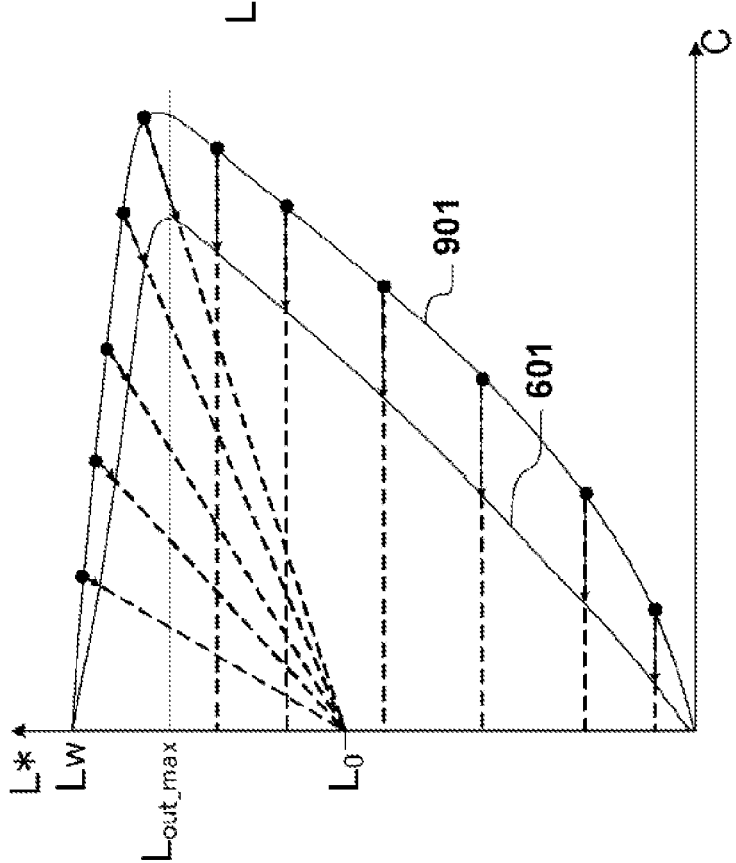

FIGS. 9A and 9B are conceptual diagrams showing results of color gamut compression according to the present embodiment, which correspond to the examples of FIGS. 6A and 6B. In the description, a plurality of grid points in Adobe RGB input color reproduction region are used. Actually, the hue angle θ varies from grid point to grid point and thus the boundary line of the output color reproduction region differs, but they are assumed to be the same in the description. The line 601 indicates the boundary line of the output color reproduction region, and a line 901 indicates the boundary line of the input color reproduction region in Adobe RGB that is the input color space. There are grid points on the boundary line of the input color reproduction region, indicating the state of color compression. In FIG. 9A, color compression has been performed such that the target grid points above $L_{out\_max}$ are converged toward the convergence point L0 that is located below $L_{out\_max}$. The other grid points are subjected to lightness maintaining color compression. In FIG. 9B, on the other hand, the grid points on the boundary line of the input color reproduction region are all subjected to lightness maintaining color compression.

In step S511, the color conversion table determined in the previous step is converted to a format that can be processed in the color conversion processing unit 207, and stored in the color conversion table storage unit 206. In the example described above, the color conversion table for conversion from the input color space to the output color space was created, and if the table can be handled in the color conversion processing unit 207, it is unnecessary to perform this conversion. However, if, for example, a color conversion table for converting the standard color space to the output color space has been created in steps S507 and S508, processing is performed in which a color conversion table for conversion from the input color space to the output color space is created by combining it with input color gamut information from the input color space to the standard color space. The output color gamut storage unit 204 shown in FIG. 2 stores L*a*b* corresponding to the input RGB values serving as the first output color gamut information. The L*a*b* values obtained in the previous step have been compressed into the output color gamut. Accordingly, based on the first output color gamut information, output RGB values corresponding to the L*a*b* values determined in step S510 are calculated by reverse interpolation processing, which is a known technique. Then, a color conversion table is generated in which the input RGB values that have output the L*a*b* values and the calculated output RGB values are associated with each other. The generated color conversion table is stored and managed in the color conversion table storage unit 206 shown in FIG. 2, and is set so as to be processable in the color conversion processing unit 207.

Through the above steps, the process for generating a color conversion table ends. The created color conversion table is a color conversion table for conversion from the input color space to the output color space, and thus in a strict sense, may not be an output profile itself corresponding to the output color gamut. However, a color conversion table for conversion from the input color space to the output color space can be created by combining an output profile and an input profile using the standard color space as an intermediary, and therefore it can be said that the color conversion table creation is substantially the same as output profile creation.

The foregoing has been described using CIE-L*a*b* color space as the standard color space, but similar effects can be obtained even when other color spaces are used such as J*C*H* color space, sRGB, Adobe RGB, PCS (profile connection space), proprietary color space of input device/image output apparatus manufacturers, and device-independent color space. It should be noted, however, that it is necessary to use, as the standard color space, the one that encompasses device-dependent color space.

Figure 10:
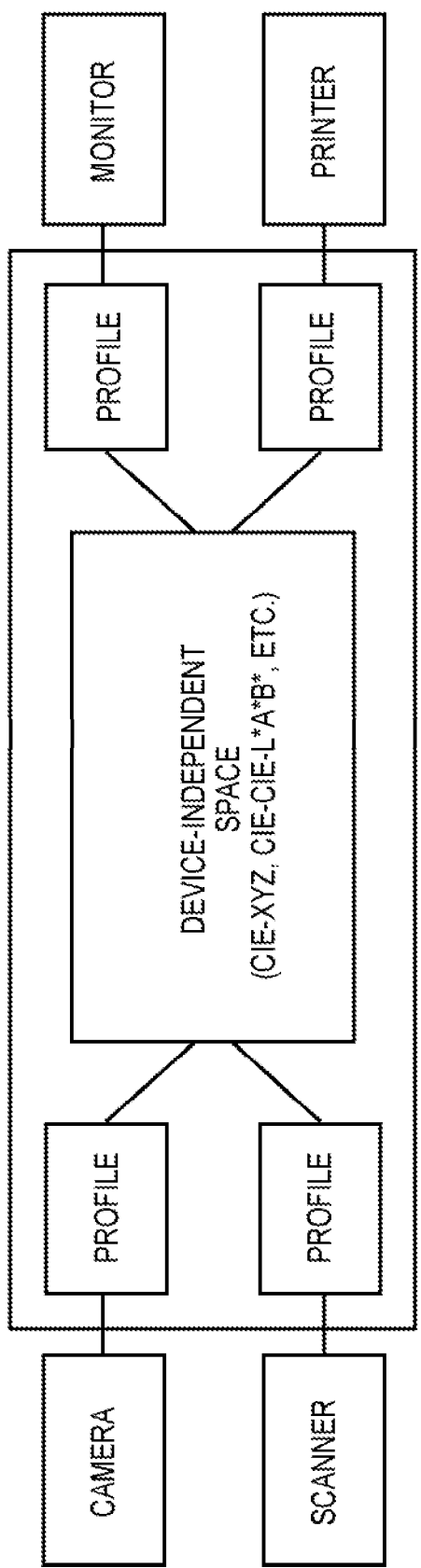
FIG. 10 is a diagram showing an overview of a color management system using ICC profiles.

In the above embodiment, the color conversion processing in the case of color print processing has been described using the conversion procedure from RGB values to RGB values, but it can be carried out by processing using color profiles proposed by the International Color Consortium (ICC) shown in FIG. 10. In addition, the above embodiment has been described using a printer apparatus and system that use the color gamut compression according to the present invention, but the present invention is not limited to the above embodiment. It is easy to carry out the present invention as, for example, software and a system that generate color profiles, and the present invention can be carried out in various ways without departing from the scope thereof.

The present embodiment has been described taking a case in which conversion tables (LUTs) are used as profiles for use in color conversion as an example. However, the present invention is not limited to color conversion using tables, and encompasses other methods such as functions for implementing conversion corresponding to the conversion using tables of the present embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-040842, filed on Feb. 25, 2011, which is hereby incorporated by reference herein in its entirety.

What is claimed is:

1. A profile creation apparatus for creating a color profile in which color conversion from first color space to second color space that is different from the first color space is defined, the apparatus comprising:
    a color gamut information obtaining unit configured to obtain second color gamut information in which the second color space and standard color space are associated with each other;
    a comparison unit configured to, for each hue of interest, compare a difference in the second color space between color lightness corresponding to maximum chroma in the standard color space and maximum lightness in the second color space, with a predetermined threshold value; and
    a profile creation unit configured to, in a case where the difference is smaller than or equal to the threshold value, create a color profile by compressing a color, in the first color space, that has higher lightness than lightness corresponding to the maximum chroma into a color gamut of the second color space, using, as a focus point, a point on a lightness axis at which lightness is lower than the lightness corresponding to the maximum chroma.

2. The profile creation apparatus according to claim 1, wherein in a case where the difference is greater than the threshold value, the profile creation unit creates a color profile by compressing the color in the first color space into a color gamut of the second color space while maintaining lightness of the color in the first color space.

3. The profile creation apparatus according to claim 1, wherein in a case where a color corresponding to the second color space is included in the first color space, the profile creation unit creates a color profile by associating the color in the first color space and the color in the second color space with each other.

4. The profile creation apparatus according to claim 1, wherein the profile creation unit creates a color profile storing, for each grid point in the first color space, a color value in the second color space corresponding to the grid point.

5. The profile creation apparatus according to claim 1, wherein the obtaining unit uses print settings including both or either of print paper type and print quality as parameters and obtains the second color gamut information corresponding to values of the parameters.

6. A non-transitory computer-readable medium storing a program for causing a computer to function as the profile creation apparatus according to claim 1.

7. A profile creation method executed by a profile creation apparatus for creating a color profile in which color conversion from first color space to second color space that is different from the first color space is defined, the method comprising the steps of:
    obtaining second color gamut information in which the second color space and standard color space are associated with each other;
    comparing, for each hue of interest, a difference in the second color space between color lightness corresponding to maximum chroma in the standard color space and maximum lightness in the second color space, with a predetermined threshold value; and
    in a case where the difference is smaller than or equal to the threshold value, creating a color profile by compressing a color, in the first color space, that has higher lightness than lightness corresponding to the maximum chroma into a color gamut of the second color space, using, as a focus point, a point on a lightness axis at which lightness is lower than the lightness corresponding to the maximum chroma.

8. An image processing apparatus that includes a color profile created by the profile creation apparatus according to claim 1 as an output profile and that coverts input image data in the first color space that has been converted to colors in the standard color space to output image data in the second color space using the output profile and then outputs the output image data.

* * * * *